United States Patent [19]
Park et al.

[11] Patent Number: 6,120,004
[45] Date of Patent: Sep. 19, 2000

[54] VARIABLE CAPILLARY APPARATUS FOR HYDROSTATIC BEARING AND MOTION ERROR COMPENSATING METHOD USING SAME

[75] Inventors: Chun-Hong Park; Hu-Sang Lee, both of Taejon, Rep. of Korea

[73] Assignee: Korea Institute of Machinery and Materials, Taejon, Rep. of Korea

[21] Appl. No.: 09/098,257

[22] Filed: Jun. 16, 1998

[51] Int. Cl.[7] .................................................. F16K 31/02
[52] U.S. Cl. ...................................... 251/129.06; 251/902
[58] Field of Search ................................. 251/11, 129.06, 251/902

[56] References Cited

U.S. PATENT DOCUMENTS

| | | | |
|---|---|---|---|
| 2,887,294 | 5/1959 | Hahn | 251/129.06 |
| 3,174,716 | 3/1965 | Salter | 251/129.06 |
| 4,284,263 | 8/1981 | Newcomb | 251/129.06 |
| 5,092,360 | 3/1992 | Watanabe et al. | 251/129.06 X |

*Primary Examiner*—Kevin Lee
*Attorney, Agent, or Firm*—Fish & Richardson P.C.

[57] ABSTRACT

Variable capillary apparatus and motion error compensation method using the same. The apparatus has upper and lower bodies and a leaf spring inserted therebetween. Between a lower center portion of the upper body and the spring, there is formed a capillary having a fine gap. The compensating method has the steps of installing a couple of hydrostatic bearings connected to the variable capillary apparatuses to one side of a table, installing a couple of hydrostatic bearings connected to fixed capillaries to the other side of the table, determining gains of the variable capillary apparatuses, detecting a motion error of the table by moving the table, and applying varying voltages to the variable capillary apparatuses for compensating for the motion error. The apparatus and compensating method compensate for the motion error due to geometrical errors of the table and guide rails by varying the gap of the capillary of the apparatuses.

5 Claims, 9 Drawing Sheets

VARIABLE CAPILLARY APPARATUS FOR HYDROSTATIC BEARING AND MOTION ERROR COMPENSATING METHOD USING SAME

BACKGROUND OF THE INVENTION

1. Field of the Invention

The present invention relates to a hydrostatic bearing, and in particular to a variable capillary apparatus for a hydrostatic bearing and a motion error compensating method using the same which can control a pocket pressure of a hydrostatic bearing, thereby compensating motion errors of a hydrostatic table caused by geometrical errors of a variety of precise measurement units and precise machine tools which are incorporated with the hydrostatic table.

2. Description of the Prior Art

A hydrostatic bearing is a non-contact type bearing that guides fluids such as air, a lubrication oil or the like to an inside thereof and obtains a load capacity by a restricting effect. The hydrostatic bearing attenuates an erroneous low frequency vibration transmitted along a spindle shaft or guide rails by an averaging effect of a fluid film formed between a confronting member and itself, and also attenuates a high frequency vibration by its high damping characteristics. So, the hydrostatic bearing is adequate to the spindle shaft and a transporting table of the precise machine tools so that it is utilized in the spindle shaft and guideway of various grinding machines and in the guideway of precise machine tools. FIG. 1 shows an operating principle of a hydrostatic bearing 100 and an equivalent electric circuit thereof. A table at which bearing 100 is installed linearly moves along a guideway 120. The table maintains a predetermined interval from guideway 120 by a pressurized fluid film injected from a pocket 130 formed at an upper surface thereof. A plurality of pockets can be formed at the transporting table of the machine tools. The fluid flow into the pockets is regulated such that the fluid can apply a proper pressure in response to a load applied to the table. In case of a single pad type hydrostatic bearing, bearing gap h is evaluated from the principle that the sum of a load W applied to the table including the weight of the table is equal to the integration of pressure P formed between the guideway and the table with respect to an entire bearing area A, as shown in equation (1). That is, $$W = \int Pd A = \overline{A}AP_r = \frac{\overline{A}AP_s}{1 + \frac{Bh^3}{k_c}} \quad (1)$$

In equation (1), $\overline{A}$, $\overline{B}$ are a nondimentional area and a flowrate defined by the pocket area with respect to the entire bearing area; Ps is a supply pressure of a fluid supply device; Pr is a pocket pressure; and kc is a capillary coefficient of the capillary device for giving a stiffness to the hydrostatic bearing.

Thus, $\overline{A}$, $\overline{B}$ increase with the pocket area.

Although the hydrostatic bearing has advantages such as low friction and a high moving accuracy due to an averaging effect, it has a disadvantage such as low stiffness. To improve the stiffness of the hydrostatic bearing, it is effective to minimize the bearing gap. In addition, to optimally design a bearing with a small bearing gap, the amount of a fluid that flows in the bearing should be restricted correspondingly to the bearing gap.

However, when the bearing gap decreases, the machining accuracy of the bearing should be improved. Thus, there is a limitation on the improvement of the stiffness of the bearing by means of a decrease of the bearing gap. To overcome the limitation, various riable restricting mechanisms have been proposed.

As an example of such mechanisms, a diaphragm type variable restricting bearing 200 or 250 as shown in FIG. 2 or 3 is known. In this example, bearing surfaces 210 and 260 are composed of elastically deformabe diaphragms. The shapes of bearing surfaces 210 and 260 are deformed corresponding to pressure changes on bearing surfaces 210 and 260 due to load changes applied to the bearings 200 and 250. Thus, a high bearing stiffness can be accomplished. Particularly, in the mechanism shown in FIG. 3, the inner periphery of the diaphragm 260 is elastically supported by an O-ring 270. The pressure of the rear surface of the diaphragm 260 varies corresponding to the pressure on the bearing surface 260 through a small hole 290 formed nearly at the center of the housing. Thus, the shape of the diaphragm sensitively varies corresponding to the variation of the load. Such a diaphragm type variable restricting bearing has been disclosed heretofore.

When the above-described diaphragm type variable restricting mechanism is used with proper bearing conditions, high bearing stiffness can be accomplished. However, the above-described diaphragm type variable restricting mechanism has the following disadvantages: (a) since the bearing surface should be deformed, the applications of the bearing are limited; (b) when the diaphragm is largely deformed, a pocket is formed in the bearing. Thus, the diaphragm may self-oscillate due to a compression of air; and (c) it is difficult to machine the diaphragm. Depending on the machining accuracy, the bearing characteristics vary, thereby affecting the durability of the diaphragm.

Meanwhile, in manufacturing the spindle shaft and the table using the hydrostatic bearing, further in the case of the spindle shaft, a manufacturing precision must be achieved in its circular and cylindrical contours. And in the case of the table, the manufacturing precision must be achieved in a straightness, a flatness, and a right angled degree of each rail, and a degree of a parallel layout and a degree of a perpendicular layout in view of a couple of parallel rails. So, although we can expect the averaging effect of the fluid film, it is difficult to achieve a displacement precision having an order of a micron. In addition, since a motion error due to the manufacturing error depends on the geometrical shape of the table and rails, even if the peripheral devices have high precision, it is difficult to compensate for the motion error.

In the prior art, three types of compensation have been proposed. Fixed compensation uses a capillary or orifice to act as a fixed-value resistance. Variable compensation includes the use of diaphragms and valves to provide a flow inversely proportional to the pocket resistance, thereby creating a larger pressure differential than created with the use of a fixed compensation device. Both of these types of compensation, however, must be tuned to the bearing gap.

As smaller and smaller bearing gaps are sought in order to increase the performance of the bearing, manufacturing errors make the use of either of these types of compensation more and more difficult by requiring hand-tuning of the compensation device. Since a machine tool with three axes may have 36 bearing pockets, the labor required becomes prohibitive.

A third type of compensation is called self-compensation because it uses the change in bearing gap to allow the bearing to change the flow of fluid to the pockets by itself. Existing self-compensation methods have utilized linear passageways on the face of the bearing and have been directed primarily to applications in spindles. These design have not, however, proven themselves to provide acceptable performance in the commercial section because of inefficient flow patterns that are difficult analytically to determine, particularly the flow field near the end of the linear grooves, often resulting in improper resistance design and which then require hand-tuning of the compensator. Difficulty has also been experienced with prior linear groove self-compensation units because the geometry has not always been realistically implementable.

SUMMARY OF THE INVENTION

The present invention is intended to overcome the above-described disadvantages. Therefore, it is a first object of the present invention to provide a variable capillary apparatus which can control a flowrate of a fluid flowing into a hydrostatic bearing so as to adjust a stiffness of the hydrostatic bearing.

Furthermore, it is a second object of the present invention to provide a motion error compensating method which uses the variable capillary apparatus so as to compensate for an erroneous motion of a spindle shaft or a hydrostatic table by applying a compensating voltage to the variable capillary apparatus.

In order to achieve the first object of the present invention, there is provided a variable capillary apparatus, which comprises:

a base plate;

a first hollow cylindrical member assembled to an upper portion of the base plate;

a first means assembled to an upper portion of the first hollow cylindrical member for guiding a fluid flow;

a second means installed between the first hollow cylindrical member and the first means for controlling an amount of a fluid flowing into the first means by changing its shape; and a third means for changing the shape of the second means.

According to a preferred embodiment of the present invention, the first means includes a second hollow cylindrical member having an outer diameter identical to an outer diameter of the first hollow cylindrical member, a lower portion of the second hollow cylindrical member being opened, the second hollow cylindrical member being formed at an upper portion thereof with a first opening for introducing the fluid therethrough, being formed at a circumferential portion of the first opening with an annular guide having an inner diameter substantially identical to a size of the first opening and extending downward so as to guide the fluid flowing thereinto through the first opening toward a lower portion of the second hollow cylindrical member, and being formed at a side thereof with a second opening for drawing the fluid out of the second hollow cylindrical member.

The first and second openings are formed at inner walls thereof with female screwed portions so as to be assembled with a first pipe connected to a fluid supply source and a second pipe connected to a hydrostatic bearing respectively so that the variable capillary apparatus is communicated with the fluid supply source and the hydrostatic bearing.

According to a preferred embodiment of the present invention, the second means includes a leaf spring having a circular shape, a size of which being substantially identical to the outer diameters of the first and second hollow cylindrical members, the leaf spring being assembled between the first and second hollow cylindrical members and being upwardly bent by a force applied to an underside thereof so that a gap of a capillary portion formed between an upper surface of the leaf spring and a lower edge of the annular guide is changed, thereby controlling the amount of the fluid flowing into the second hollow cylindrical member.

According to a preferred embodiment of the present invention, the third means includes a piezoelectric element installed in the first hollow cylindrical member in such a manner that an upper edge of the piezoelectric element makes contact with the underside of the leaf spring, the upper edge of the piezoelectric element moving vertically according to a voltage applied thereto so as to change the gap of the capillary portion.

As the voltage being applied to the piezoelectric element increases, the upper edge of the piezoelectric element moves upward so as to decrease the gap of the capillary portion so that the amount of the fluid flowing into the second hollow cylindrical member decreases, and contrarily, as the voltage being applied to the piezoelectric element decreases, the upper edge of the piezoelectric element moves downward so as to increase the gap of the capillary portion so that the amount of the fluid flowing into the second hollow cylindrical member increases.

According to a preferred embodiment of the present invention, a screw for preload is installed at a bottom of the first hollow cylindrical member for setting an initial gap of the capillary portion by adjusting a vertical position of the piezoelectric element.

Also, in order to achieve the second object of the present invention, there is provided a method for compensating a motion error of a table slidably mounted to first and second guide rails juxtaposed with each other in a first direction, by using first, second, third and fourth hydrostatic bearings, pockets of which are connected to outlets of first and second variable capillary apparatuses and first and second fixed capillaries respectively in which inlets of the first and second variable capillary apparatuses and the first and second fixed capillaries are connected to a fluid supply source, which comprises the steps of:

(1) installing the first hydrostatic bearing to a first side portion of a first underside surface of the table confronting a vertical surface of the first guide rail;

(2) installing the second hydrostatic bearing to a second side portion of the first underside surface of the table, the second side portion being spaced apart from the first side portion by a predetermined interval in the first direction;

(3) installing the third hydrostatic bearing to a third side portion of a second underside surface of the table confronting a vertical surface of the second guide rail, the third side portion being in an aligned position with the first side portion along a second direction perpendicular to the first direction;

(4) installing the fourth hydrostatic bearing to a fourth side portion of the second underside surface of the table, the fourth side portion being in an aligned position with the second side portion along the second direction;

(5) detecting displacements of the table in the second direction at each time while applying step voltages to the first and second variable capillary apparatuses;

(6) determining first and second gains of the first and second variable capillary apparatuses by evaluating relationships between the voltage applied to the first and second variable capillary apparatuses and the displacements of the table in the second direction;

(7) detecting a motion error of the table in the second direction due to geometrical errors of the table and the first and second guide rails by moving the table in the first direction while no voltage is applied to the first and second variable capillary apparatuses; and (8) applying varying voltages to the first and second variable capillary apparatuses respectively for compensating the motion error according to the first and second gains while moving the table in the first direction.

According to a preferred embodiment of the present invention, in step (5), the displacements of the table in the second direction are detected at a first position aligned with the first side portion of the first underside surface of the table along the second direction, a second position aligned with the second side portion of the first underside surface of the table along the second direction and a third position interposed between the first and second positions.

In step (5), the step voltages are applied to first and second piezoelectric elements installed in the first and second variable capillary apparatuses respectively so as to adjust gaps of first and second capillary portions for controlling an amount of a fluid flowing into the first and second variable capillary apparatuses and to change pocket pressures of the first and second hydrostatic bearings, thereby moving the table in the second direction.

Meanwhile, in step (6), the first and second gains are determined by linearizing the relationships between the voltage and the displacements of the first and second variable capillary apparatuses, respectively.

In step (7), the motion error has a repeatability so that the voltages to be applied to the first and second variable capillary apparatuses while the table moving in the first direction are specified.

According to a preferred embodiment of the present invention, the first and second variable capillary apparatuses have the first and second piezoelectric elements having maximum deviation ranges which overlap the motion error.

The motion error includes straightness and angular errors of the table and the first and second guide rails, the angular error being an error of the table about an axis perpendicular to both of the first and second directions, the straightness and angular errors being simultaneously compensated by varying voltages applied to the first and second variable capillary apparatuses according to the first and second gains.

As described above, the variable capillary apparatus and the motion error compensating method using the same can compensate for the motion error due to geometrical errors of the hydrostatic table and the guide rails by varying the gaps of the capillary portions of the variable capillary apparatuses.

BRIEF DESCRIPTION OF THE DRAWINGS

The above object and other advantages of the present invention will become more apparent by describing in detail a preferred embodiment thereof with reference to the attached drawings in which.

DETAILED DESCRIPTION OF THE INVENTION

Hereinafter, a variable capillary apparatus 400 for a hydrostatic bearing 500 according to a preferred embodiment of the present invention and the operation principle thereof will be explained in more detail with reference to the accompanying drawings.

Figure 1:
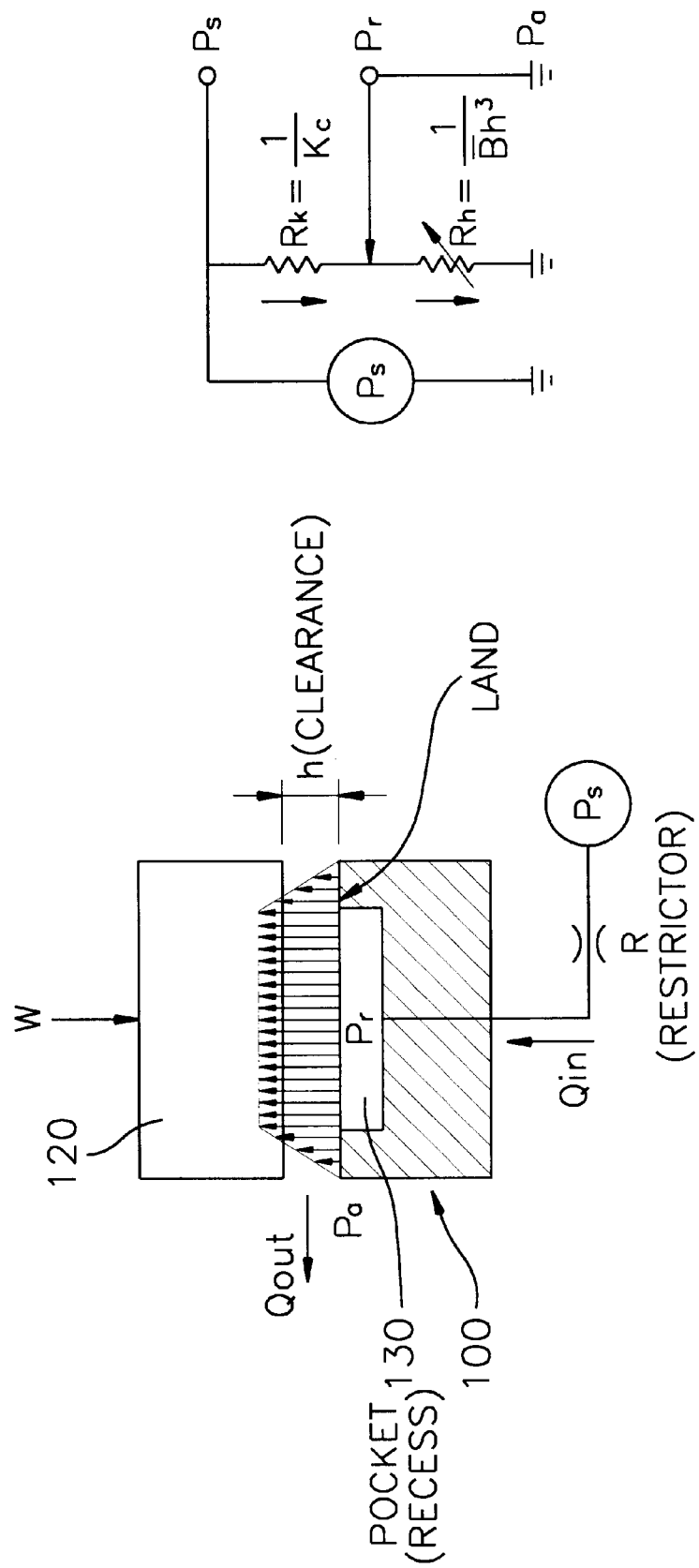
FIG. 1 is a schematic view for illustrating the operation principle of a conventional single pad type hydrostatic bearing and an equivalent electric circuit thereof.
Figure 2:
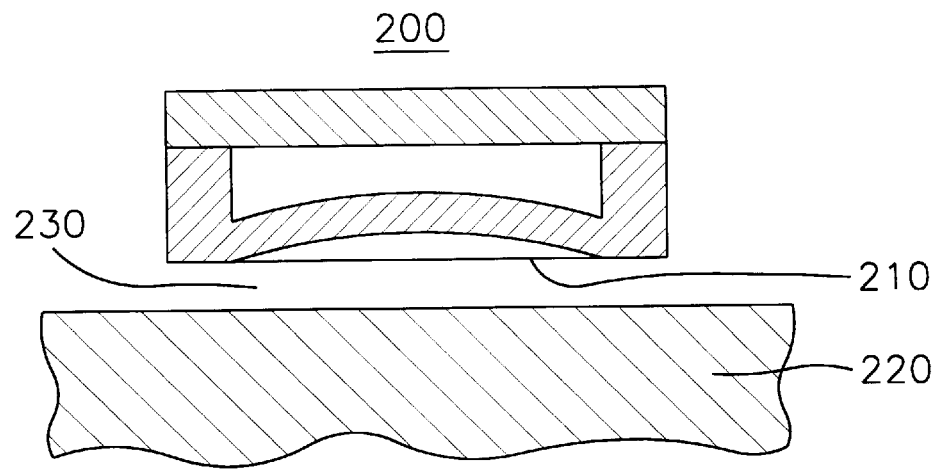
FIGS. 2 and 3 are sectional views of conventional diaphragm type hydrostatic bearings.
Figure 3:
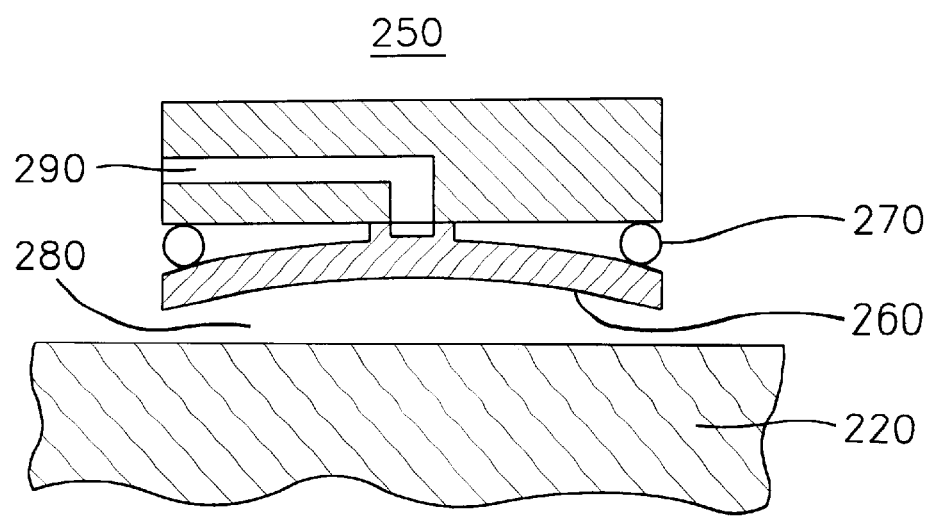
Figure 4:
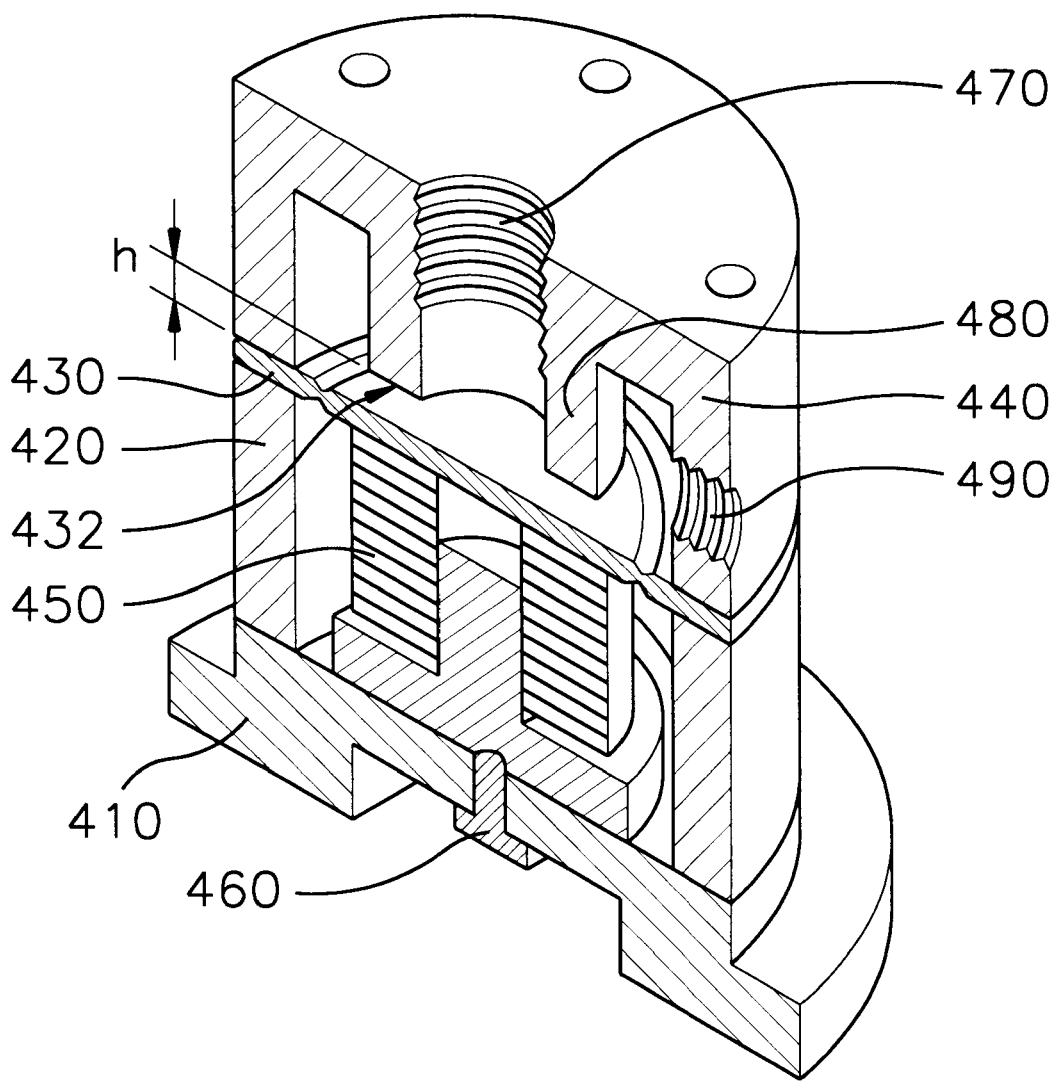
FIG. 4 is a perspective view of a variable capillary apparatus of a preferred embodiment in accordance with the present invention.
Figure 5:
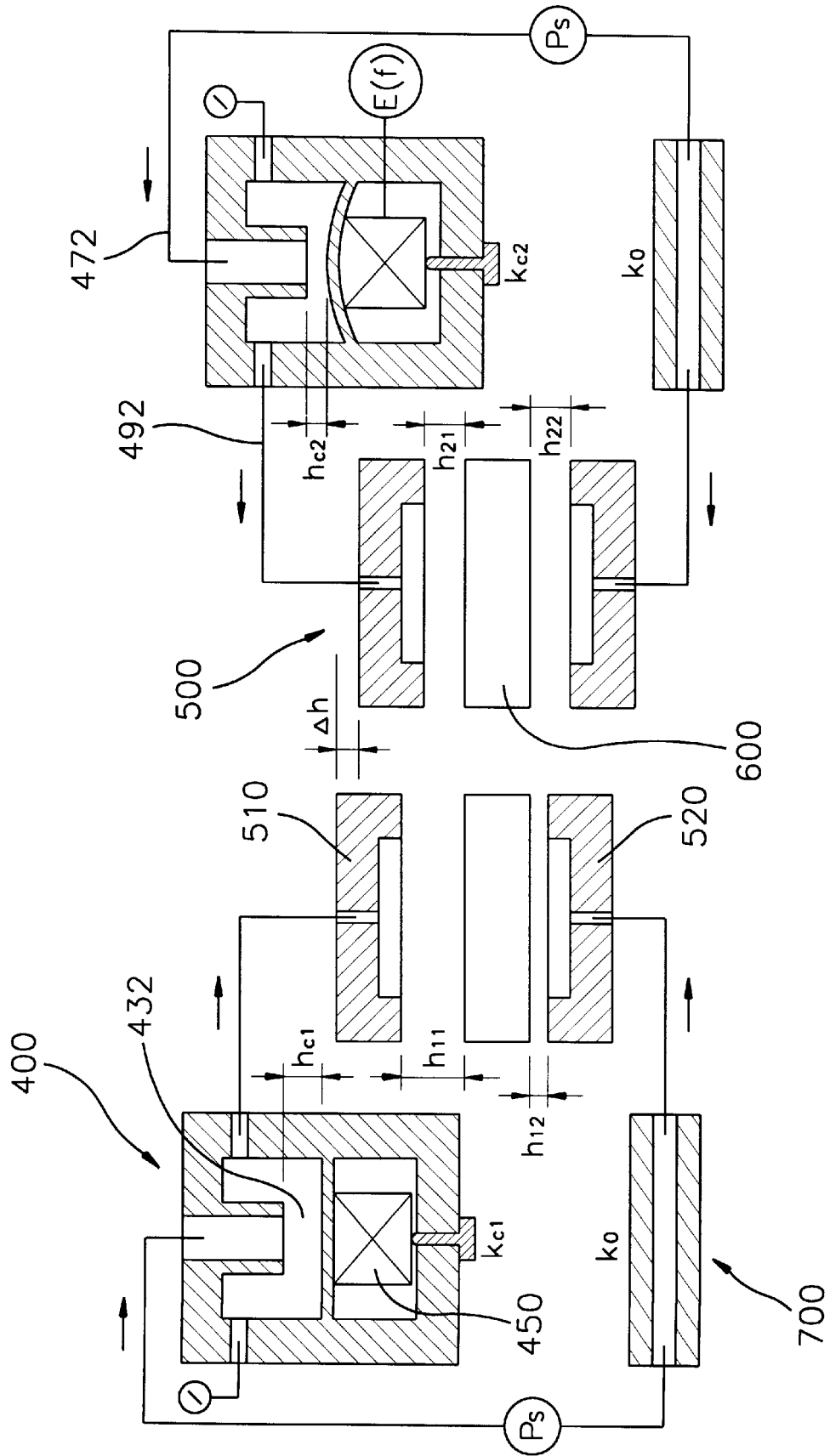
FIG. 5 is a schematic view for illustrating a motion error compensating principle of a hydrostatic table using a variable capillary apparatus of a preferred embodiment in accordance with the present invention.

FIGS. 4 and 5 shows variable capillary apparatus 400 and the operation principle thereof. Referring to FIGS. 4 and 5, variable capillary apparatus 400 has a base plate 410 having a circular shape, a first hollow cylindrical member 420 assembled to an upper portion of base plate 410, a second hollow cylindrical member 440 which has an outer diameter identical to an outer diameter of first hollow cylindrical member 420, and is assembled to an upper portion of first hollow cylindrical member 420 for guiding a fluid flow from a fluid supply source Ps and a lower portion of which is opened, a leaf spring 430 having a circular shape installed between first and second hollow cylindrical members 420 and 440 for controlling an amount of the fluid flowing into the second hollow cylindrical member 440 by changing its shape, and a piezoelectric element 450 installed in first hollow cylindrical member 420 in such a manner that an upper edge thereof makes contact with the underside of leaf spring 430 for changing the shape of leaf spring 430.

Second hollow cylindrical member 440 is formed at an upper portion thereof with a first opening 470 for introducing the fluid therethrough, and is formed at a circumferential portion of first opening 470 with an annular guide 480 having an inner diameter substantially identical to a size of first opening 470 and extending downward so as to guide the fluid flowing thereinto through first opening 470 toward a lower portion of second hollow cylindrical member 440. According to a preferred embodiment of the present invention, a capillary portion 432 having a fine gap h is formed between an upper surface of leaf spring 430 and a lower edge of annular guide 480. According to a preferred embodiment of the present invention, gap h is on an order of tens of microns.

An upper edge of piezoelectric element 450 moves vertically in response to a voltage applied thereto so as to change gap h of capillary portion 432. A size of leaf spring 430 is substantially identical to the outer diameters of first and second hollow cylindrical members 420 and 440. Leaf spring 430 is assembled between first and second hollow cylindrical members 420 and 440 and is upwardly bent by a force applied to an underside thereof so that gap h of capillary portion 432 formed between the upper surface of leaf spring 432 and the lower edge of annular guide 480 is changed, thereby controlling the amount of the fluid flowing into second hollow cylindrical member 440.

That is, as the voltage being applied to piezoelectric element 450 increases, the upper edge of piezoelectric element 450 moves upward so as to decrease gap h of capillary portion 432 so that the amount of the fluid flowing into second hollow cylindrical member 440 decreases, and contrarily, as the voltage being applied to piezoelectric element 450 decreases, the upper edge of piezoelectric element 450 moves downward so as to increase gap h of capillary portion 432 so that the amount of the fluid flowing into second hollow cylindrical member 440 increases.

According to a preferred embodiment of the present invention, a screw for preload 460 is installed at a bottom of first hollow cylindrical member 420 for setting an initial gap of capillary portion 432 by adjusting a vertical position of piezoelectric element 450.

On the other hand, second hollow cylindrical member 440 is formed at a side thereof with a second opening 490 for drawing the fluid out of second hollow cylindrical member 440.

First and second openings 470 and 490 are formed at inner walls thereof with female screwed portions so as to be assembled with a first pipe 472 connected to a fluid supply source Ps and a second pipe 492 connected to hydrostatic bearing 500 respectively so that variable capillary apparatus 400 is communicated with fluid supply source Ps and hydrostatic bearing 500.

Meanwhile, FIG. 5 is a schematic view illustrating a hydrostatic table movement principle by using variable capillary apparatus 400.

Referring to FIG. 5, hydrostatic bearing 500 is connected at an upper pad 510 thereof to variable capillary apparatus 400, and is connected at a lower pad 520 thereof to a conventional fixed capillary 700. When it is required to move hydrostatic bearing 500 by Δh at this state, a corresponding voltage is applied to piezoelectric element 450 so that gap h of capillary portion 432 decreases and accordingly, a flow resistance thereof increases, thereby reducing the pocket pressure in upper pad 510. At this time, since each force evaluated by integrating the pressure distribution acting a guide rail 600 by each pad must be equal, upper pad 510 moves downward by Δh such that the pocket pressure in upper pad 510 increases. By using the above described principle, a relationship between the pressure applied to piezoelectric element 450 and the displacement of hydrostatic bearing 500 can be evaluated. Thus, a motion error of the hydrostatic table which is within a range of a maximum displacement of the hydrostatic table 810 which can be achieved by piezoelectric element 450 can be compensated.

Figure 6A:
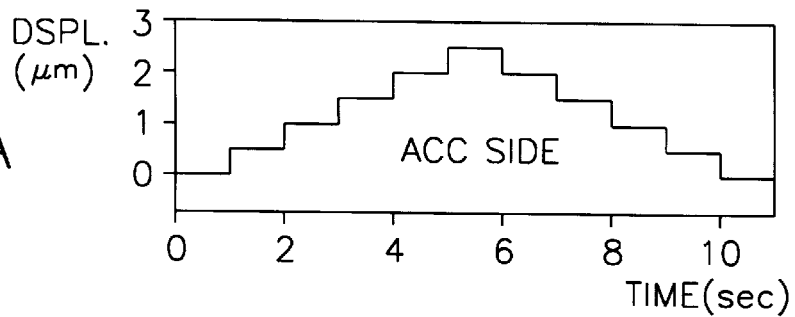
FIGS. 6A to 6D are graphs showing displacements and pocket pressures of a variable capillary apparatus of a preferred embodiment in accordance with the present invention when step voltages are applied thereto.
Figure 6B:
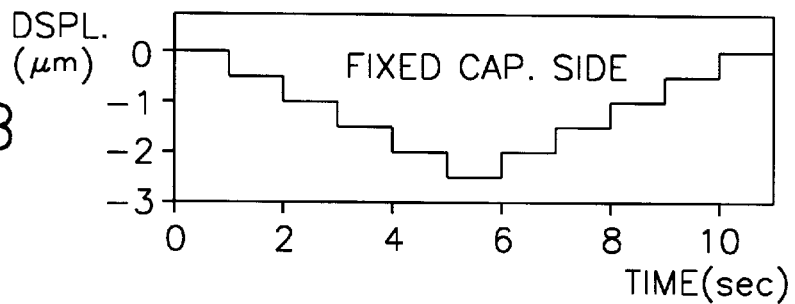
Figure 6C:
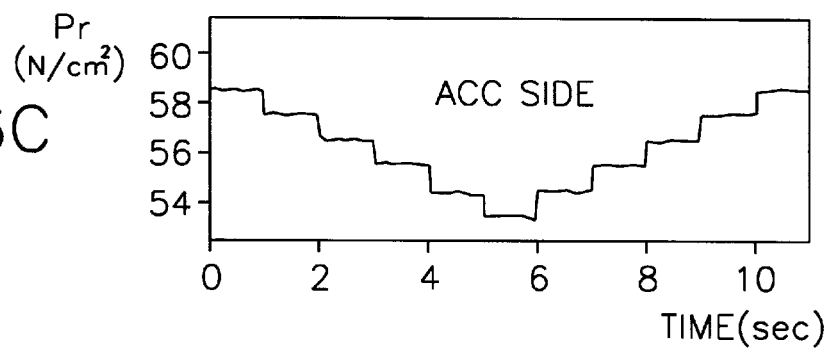
Figure 6D:
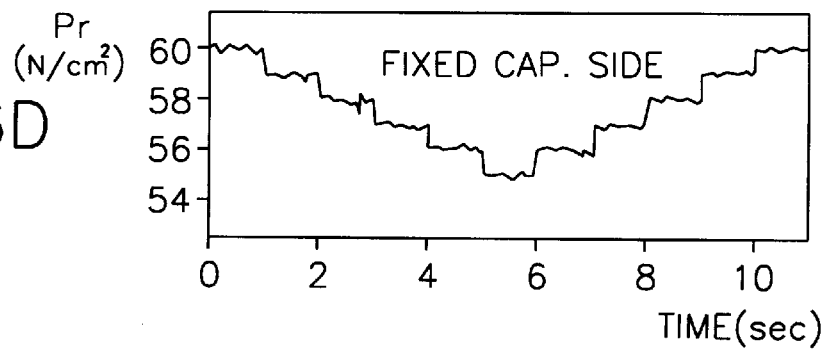
Figure 7:
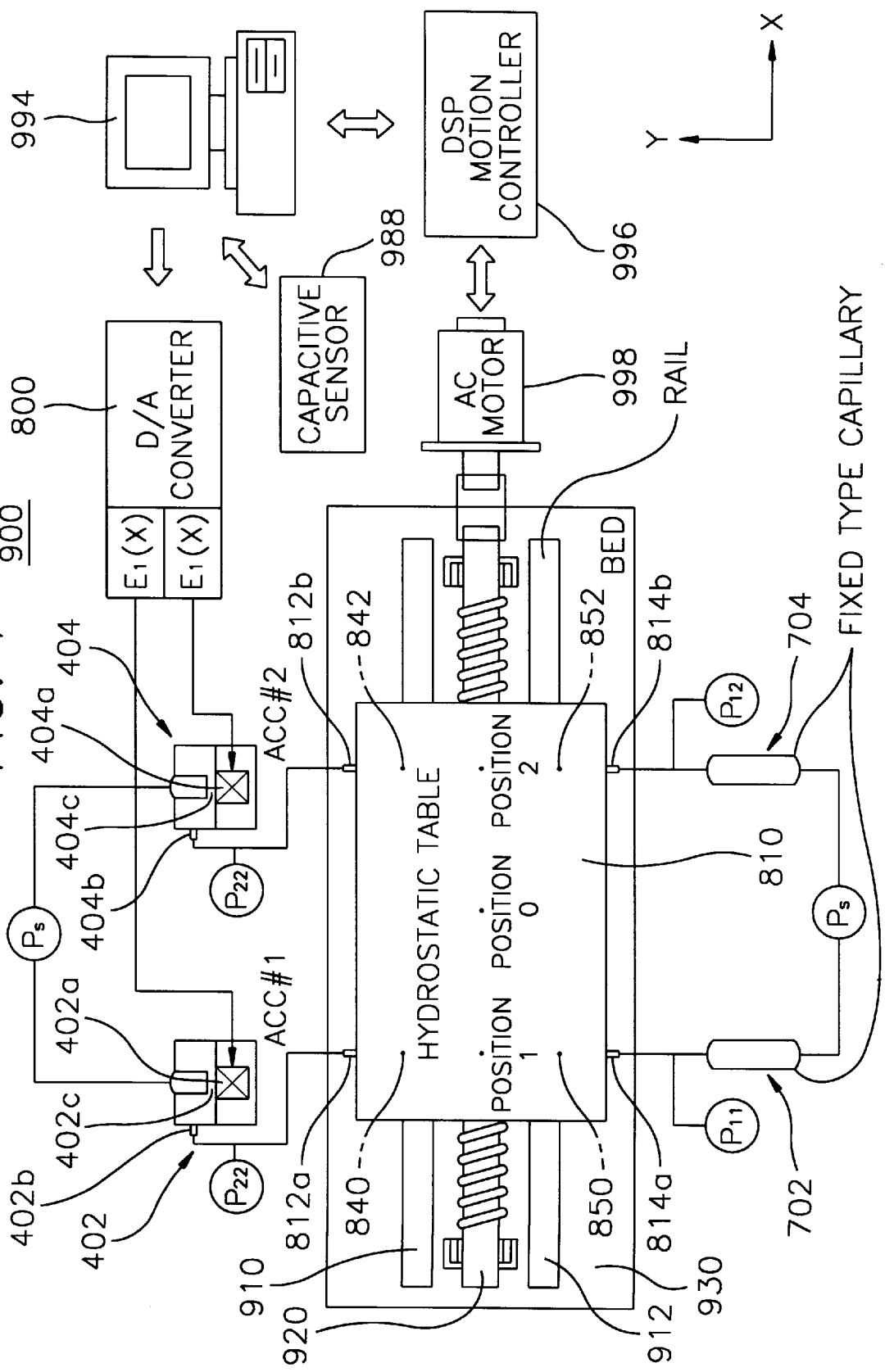
FIG. 7 shows an experimental setup for evaluating a compensating performance of the variable capillary apparatus of a preferred embodiment in accordance with the present invention with respect to straightness and angular errors of the hydrostatic table.

FIG. 6A is a graph showing a displacement of the hydrostatic table surface adjacent to upper pad 510 connected to variable capillary apparatus 400 responding to a step pressure of 1 V/step applied by D/A converter 800 which is shown in FIG. 7 at a supply pressure of 100 N/cm². The displacement of the hydrostatic table follows properly in response to the step voltages. As is known from the graph, a gain of the hydrostatic table with respect to D/A converter 800 is 0.55 μm/V. FIG. 6B is a graph showing a displacement of the hydrostatic table surface adjacent to the opposite side pad 520 connected to fixed capillary 700. The displacement of the table surface is substantially the same as that of FIG. 6A. so, we can find that an elastic deformation of the table is not occurred. FIGS. 6C and 6D are graphs showing pocket pressure variations of both pads 510 and 520 in response to the step pressure. As is obvious from the above graphs, the pocket pressure follows properly the change of the gap h of capillary portion 432. Accordingly, the hydrostatic table moves to a new position in a state of equilibrium.

Hereinafter, a motion error compensating method of the hydrostatic table by using a variable capillary apparatus according to a preferred embodiment of the present invention will be described in more detail with reference to the accompanying drawings.

Figure 8:
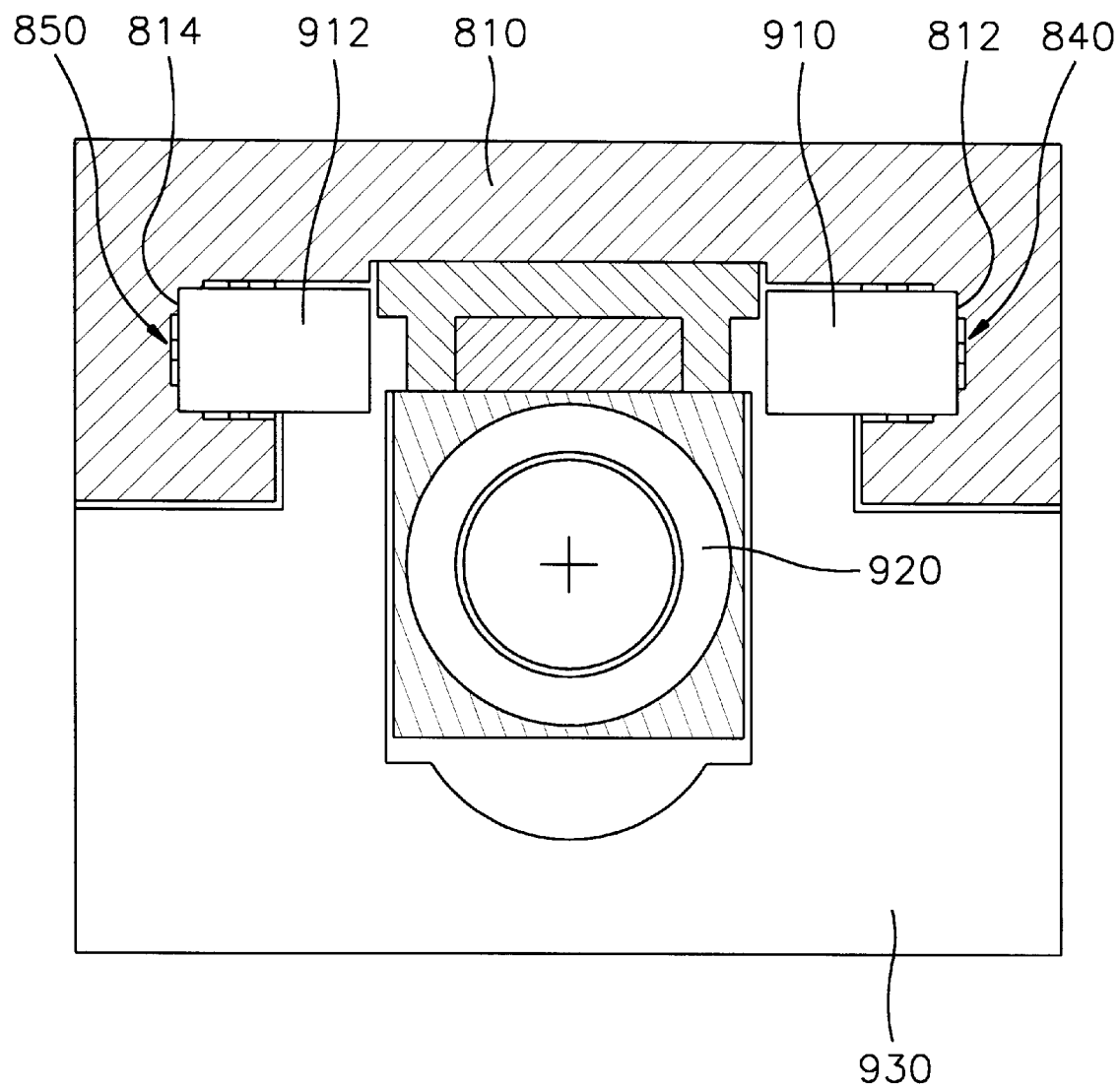
FIG. 8 is a sectional view of the hydrostatic table shown in FIG. 7.

FIGS. 7 and 8 show an experimental setup 900 for evaluating a compensating performance of a variable capillary apparatus and the structure of a hydrostatic table 810, respectively. Referring to FIGS. 7 and 8, hydrostatic table 810 is a double pads type table. Hydrostatic table 810 is slidably mounted to first and second guide rails 910 and 912 juxtaposed with each other in a first direction X. In this experimental setup, the motion error of hydrostatic table 810 is compensated by using first, second, third and fourth hydrostatic bearings, pockets of which are connected to outlets of first and second variable capillary apparatuses 402 and 404 and first and second fixed capillaries 702 and 704 respectively in which inlets of first and second variable capillary apparatuses 402 and 404 and first and second fixed capillaries 702 and 704 are connected to a fluid supply source Ps.

Figure 10:
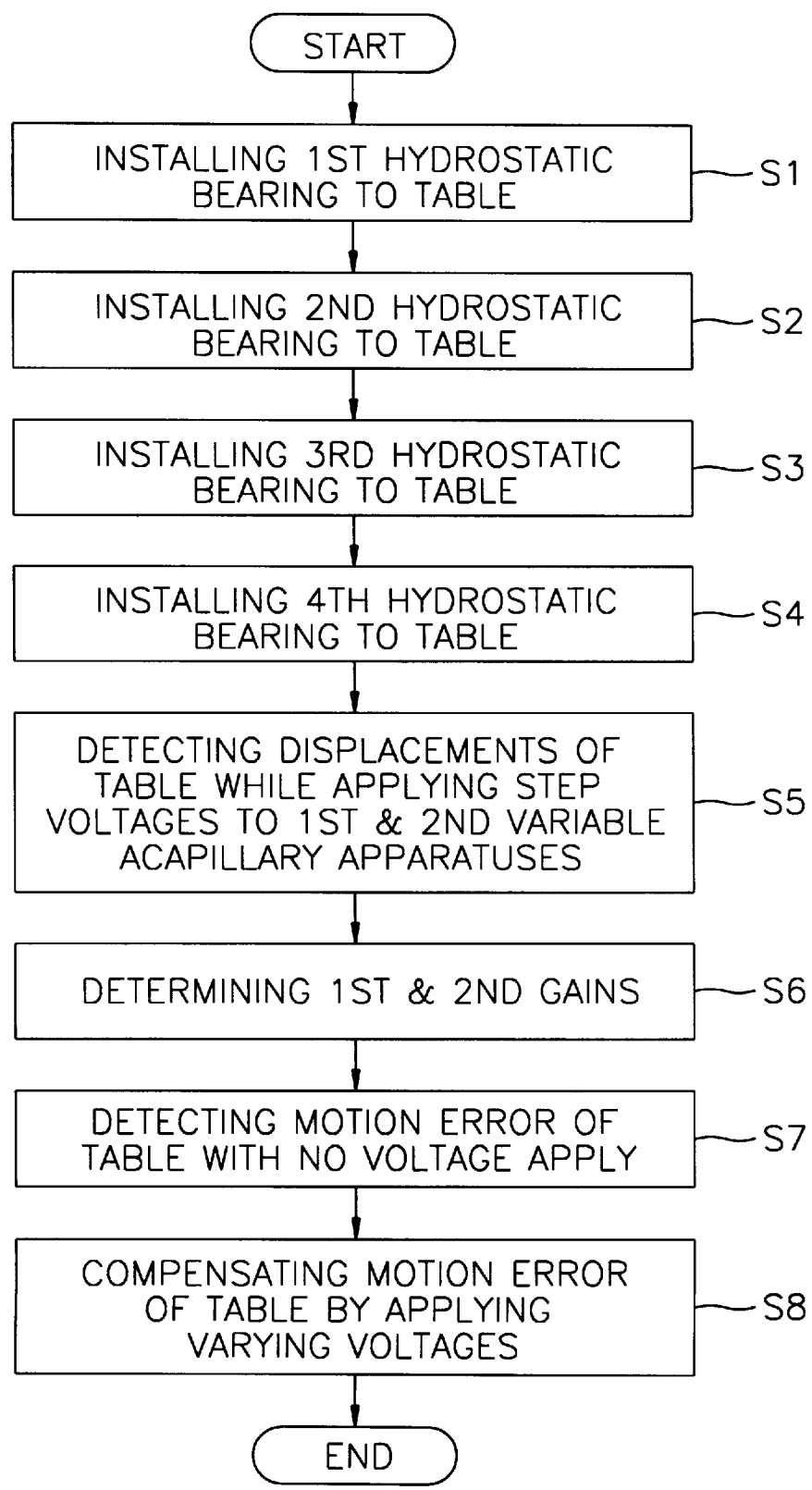
FIG. 10 is a flowchart for illustrating the motion error compensating method of a preferred embodiment of the present invention.

As is shown in FIG. 10, the hydrostatic bearings are installed to hydrostatic table 810 as following method comprising the steps of: (1) installing first hydrostatic bearing 840 to a first side portion 812a of a first underside surface 812 of hydrostatic table 810 confronting a vertical surface of the first guide rail 910 (step S1); (2) installing second hydrostatic bearing 842 to a second side portion 812b of first underside surface 812 of hydrostatic table 810 wherein second side portion 821b is spaced apart from first side portion 812a by a predetermined interval along first direction X (step S2); (3) installing third hydrostatic bearing 850 to a third side portion 814a of a second underside surface 814 of hydrostatic table 810 confronting a vertical surface of second guide rail 912 wherein third side portion 814a is in an aligned position with first side portion 812a along a second direction Y perpendicular to first direction X (step S3); and (4) installing fourth hydrostatic bearing 852 to a fourth side portion 814b of second underside surface 814 of hydrostatic table 810 wherein fourth side portion 814b is in an aligned position with second side portion 812b along second direction Y (step S4).

Hydrostatic table 810 is moved by a ball screw 920, an AC servo motor 998, and a DSP(Digital Signal Processor) motion controller 996.

To control the movement of hydrostatic table 810 in linear and angular directions by using first and second variable capillary apparatuses 402 and 404, gain values of first and second variable capillary apparatuses 402 and 404, that is, the ratio of the displacement of hydrostatic table 810 to an input voltage of D/A converter, are required in advance for the compensation. For this purpose, the motion error compensating method further comprises the steps of: (5) detecting displacements of hydrostatic table 810 in second direction Y at each time while applying step voltages to first and second variable capillary apparatuses 402 and 404 (step S5); (6) determining first and second gains of first and second variable capillary apparatuses 402 and 404 by evaluating the relationships between the voltages applied to first and second variable capillary apparatuses 402 and 404 and the displacements of hydrostatic table 810 in second direction Y (step S6).

At this time, according to a preferred embodiment of the present invention, as shown in FIG. 7, in step S5, the displacements of hydrostatic table 810 in second direction Y are detected at a first position aligned with first side portion 812a of first underside surface 812 of hydrostatic table 810 along second direction Y, a second position aligned with second side portion 812b of first underside surface 812 of hydrostatic table 810 along second direction Y and a third position interposed between the first and second positions.

In step S5, the step voltages are applied to first and second piezoelectric elements 402a and 404a installed in first and second variable capillary apparatuses 402 and 404 respectively so as to adjust gaps of first and second capillary portions 402c and 404c for controlling an amount of a fluid flowing into first and second variable capillary apparatuses 402 and 404 and to change pocket pressures of first and second hydrostatic bearings 840 and 842, thereby moving hydrostatic table 810 in second direction Y. In step S6, the first and second gains are determined by linearizing the relationships between the voltage and the displacements of first and second variable capillary apparatuses 402 and 404, respectively.

At this time, the displacements of hydrostatic table 810 in second direction Y are detected by a capacitive sensor 988.

Then, the compensating method goes through the steps of (7) detecting a motion error of hydrostatic table 810 in second direction Y due to geometrical errors of hydrostatic table 810 and first and second guide rails 910 and 912 by moving hydrostatic table 810 in first direction X while no voltage is applied to first and second variable capillary apparatuses 402 and 404 (step S7); (8) applying varying voltages to first and second variable capillary apparatuses 402 and 404 respectively for compensating the erroneous motion according to the first and second gains while moving hydrostatic table 810 in first direction X (step S8).

In step S7, the motion error has a repeatability so that the voltages to be applied to first and second variable capillary apparatuses 402 and 404 while hydrostatic table 810 moving in first direction X are specified.

According to a preferred embodiment of the present invention, first and second variable capillary apparatuses 402 and 404 have first and second piezoelectric elements 402a and 404a having maximum deviation ranges which can compensate for the erroneous motion of hydrostatic table 810.

The motion error includes straightness and angular errors of hydrostatic table 810 and first and second guide rails 910 and 912. The angular error is an error of hydrostatic table 810 about an axis perpendicular to both first and second directions X and Y. According to the compensation method of the present invention, the straightness and angular errors are simultaneously compensated by varying each voltage applied to each of first and second variable capillary apparatuses 402 and 404 according to the first and second gains.

Figure 9A:
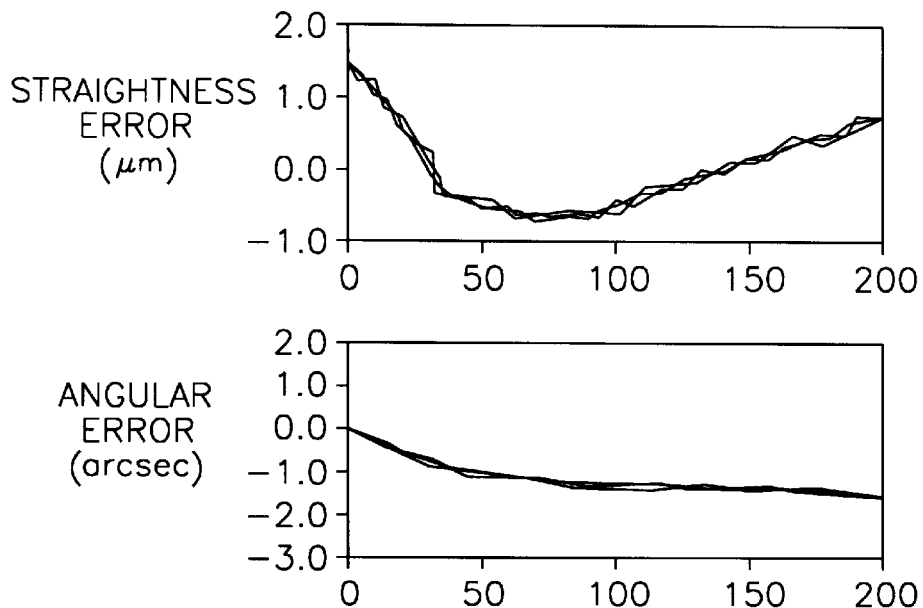
FIGS. 9A and 9B are graphs showing the results of the motion error compensation by the experimental apparatuses shown in FIG. 7.
Figure 9B:
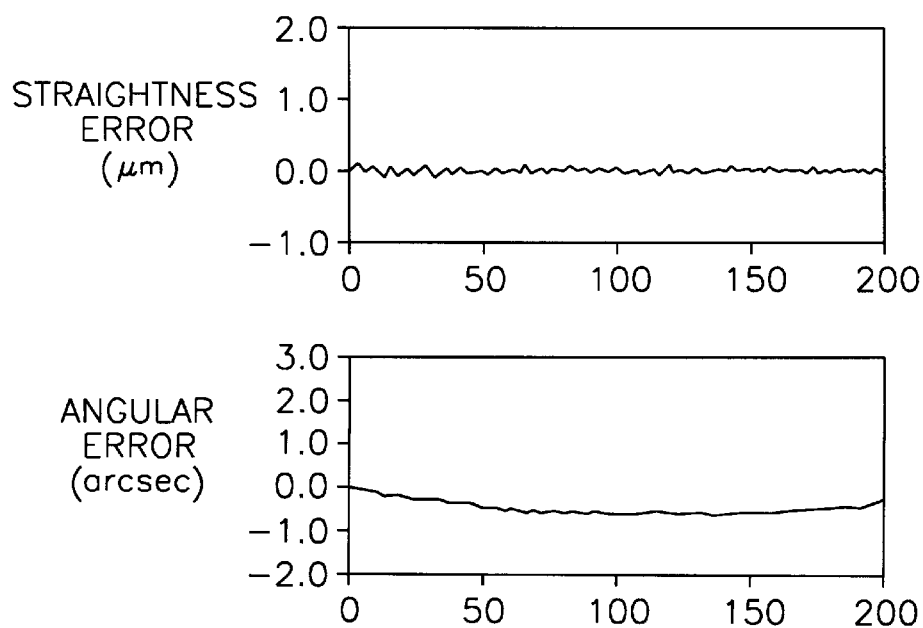

FIG. 9A shows the straightness and angular errors of hydrostatic table 810 in second direction Y. The experiment is carried out 5 times. As shown in the graphs, the straightness error is 2.21 $\mu$m and the angular error is 1.4 arcsec within the moving distance of hydrostatic table 810 of 200 mm. While in FIG. 9B, the straightness and angular errors of hydrostatic table 810 in second direction Y while actuating first and second variable capillary apparatuses 402 and 404 are shown. The straightness error is 0.25 $\mu$m which is a tenth of no compensation condition and the angular error is 0.4 arcsec which is a third of the no compensation condition within the moving distance of hydrostatic table 810 of 200 mm.

As described above, the variable capillary apparatus and the motion error compensating method using the same can compensate for the motion error due to geometrical errors of the hydrostatic table and the guide rails by varying the gap of the capillary portions of the variable capillary apparatuses.

Although the preferred embodiment of the invention has been described, it is understood that the present invention should not be limited to this preferred embodiment, but various changes and modifications can be made by one skilled in the art within the spirit and scope of the invention as hereinafter claimed.

What is claimed is:

1. A variable capillary apparatus, which comprises:
   a base plate;
   a first hollow cylindrical member assembled to an upper portion of the base plate;
   a first means assembled to an upper portion of the first hollow cylindrical member for guiding a fluid flow;
   a second means installed between the first hollow cylindrical member and the first means for controlling an amount of a fluid flowing into the first means by changing a shape thereof; and
   a third means for changing the shape of the second means;
   wherein the first means includes a second hollow cylindrical member having an outer diameter identical to an outer diameter of the first hollow cylindrical member, a lower portion of the second hollow cylindrical member being opened, the second hollow cylindrical member being formed at an upper portion thereof with a first opening for introducing the fluid therethrough, being formed at a circumferential portion of the first opening with an annular guide having an inner diameter substantially identical to a size of the first opening and extending downward so as to guide the fluid flowing there into through the first opening toward a lower portion of the second hollow cylindrical member, and being formed at a side thereof with a second opening for drawing the fluid out of the second hollow cylindrical member, the second means including a leaf spring having a circular shape, a size of which being substantially identical to the outer diameters of the first and second hollow cylindrical members, the leaf spring being assembled between the first and second hollow cylindrical members and being upwardly bent by a force applied to an underside thereof so that a gap of a capillary portion formed between an upper surface of the leaf spring and a lower edge of the annular guide is changed, thereby controlling the amount of the fluid flowing into the second hollow cylindrical member.

2. The apparatus as recited in claim 1, wherein the first and second openings are formed at inner walls thereof with female screwed portions so as to be assembled with a first pipe connected to a fluid supply source and a second pipe connected to a hydrostatic bearing respectively so that the variable capillary apparatus is communicated with the fluid supply source and the hydrostatic bearing.

3. The apparatus as recited in claim 1, the third means includes a piezoelectric element installed in the first hollow cylindrical member in such a manner that an upper edge of the piezoelectric element makes contact with the underside of the leaf spring, the upper edge of the piezoelectric element moving vertically according to a voltage applied thereto so as to change the gap of the capillary portion.

4. The apparatus as recited in claim 3, as the voltage being applied to the piezoelectric element increases, the upper edge of the piezoelectric element moves upward so as to decrease the gap of the capillary portion so that the amount of the fluid flowing into the second hollow cylindrical member decreases, and contrarily, as the voltage being applied to the piezoelectric element decreases, the upper edge of the piezoelectric element moves downward so as to increase the gap of the capillary portion so that the amount of the fluid flowing into the second hollow cylindrical member increases.

5. The apparatus as recited in claim 3, wherein a screw for preload is installed at a bottom of the first hollow cylindrical member for setting an initial gap of the capillary portion by adjusting a vertical position of the piezoelectric element.

* * * * *